(12) United States Patent
Anfinson

(10) Patent No.: US 7,649,810 B2
(45) Date of Patent: Jan. 19, 2010

(54) TAMPER RESISTANT HOURMETER FOR MOWER

(75) Inventor: Bryan L. Anfinson, Charlotte, NC (US)

(73) Assignee: Deere & Company, Moline, IL (US)

( * ) Notice: Subject to any disclaimer, the term of this patent is extended or adjusted under 35 U.S.C. 154(b) by 319 days.

(21) Appl. No.: 11/851,650

(22) Filed: Sep. 7, 2007

(65) Prior Publication Data

US 2009/0067293 A1    Mar. 12, 2009

(51) Int. Cl.
*G04F 8/00* (2006.01)
*G04F 10/00* (2006.01)
*F02P 7/00* (2006.01)

(52) U.S. Cl. ................. 368/5; 368/8; 324/402
(58) Field of Classification Search .......... 368/1, 368/5, 6, 8; 324/402; 340/457, 457.4
See application file for complete search history.

(56) References Cited

U.S. PATENT DOCUMENTS

| | | | |
|---|---|---|---|
| 1,745,284 A * | 1/1930 | Watson | 368/5 |
| 2,604,940 A * | 7/1952 | Heptinstall | 368/5 |
| 3,965,669 A * | 6/1976 | Larson et al. | 368/9 |
| 4,181,883 A * | 1/1980 | Beeghly et al. | 324/166 |
| 4,338,512 A * | 7/1982 | Ludwig | 377/20 |
| 4,593,263 A * | 6/1986 | Peckworth | 340/457.4 |
| 4,630,292 A | 12/1986 | Juricich et al. | |
| 4,725,996 A * | 2/1988 | Marble et al. | 368/9 |
| 4,985,875 A * | 1/1991 | Mitchell | 368/5 |
| 5,003,518 A * | 3/1991 | Felder | 368/5 |
| 5,337,003 A | 8/1994 | Carmichael et al. | |
| 5,593,367 A | 1/1997 | Eavenson, Sr. et al. | |
| 5,617,373 A * | 4/1997 | Kawai et al. | 368/5 |
| 5,644,491 A | 7/1997 | Fiske et al. | |
| 5,644,551 A | 7/1997 | Carmichael et al. | |
| 5,970,436 A * | 10/1999 | Berg et al. | 702/177 |
| 6,609,357 B1 | 8/2003 | Davis et al. | |
| 6,655,975 B1 | 12/2003 | Liedtke | |
| 6,835,090 B1 | 12/2004 | Liedtke | |
| 6,972,668 B2 | 12/2005 | Schauble | |
| 7,034,674 B2 | 4/2006 | Harvey | |

* cited by examiner

*Primary Examiner*—Vit W Miska

(57) ABSTRACT

A tamper resistant hourmeter is provided for an engine powered lawn mower. The hourmeter has a first pin connected to a positive voltage from a battery through a key actuated switch, a second pin to ground, a third pin to a magneto ignition, and a fourth pin to a fuel shutoff solenoid. The tamper resistant hourmeter connects the positive voltage from the battery to the fuel shutoff solenoid. The fuel shutoff solenoid opens a fuel line to the engine only if the key actuated switch is in either of the run or start positions.

6 Claims, 1 Drawing Sheet

TAMPER RESISTANT HOURMETER FOR MOWER

FIELD OF THE INVENTION

This invention relates generally to monitoring run time of grass mowing machines, and specifically to tamper resistant hourmeters.

BACKGROUND OF THE INVENTION

Grass mowing machines and other vehicles powered by internal combustion engines may be provided with hourmeters that track and display the cumulative time the engine has operated. The information may be used for a number of different purposes including vehicle warranty, service and maintenance scheduling, rental usage, or determining resale value. The following patents provide examples of hourmeters for such vehicles.

U.S. Pat. No. 4,630,292 entitled "Fuel Tax Rebate Recorder" relates to a system for recording the total time that a motor vehicle is running, including three electrically driven timers, one of which is connected in series with the oil pressure switch of the motor so that the timer is energized while the motor is running.

U.S. Pat. No. 5,337,003 entitled "Self-Contained Clip-On Engine Operating Time Log" relates to a sensor and circuitry to detect spark impulses in the ignition wire for determining the operating time of the engine.

U.S. Pat. No. 5,644,491 entitled "Self Contained Multi-Function Engine Monitor and Timer for Providing Engine Running Time, Job Time, Service Time and Tachometer Functions" relates to an engine monitor coupled to a spark pick up wire, and provides total running time, job time and service time metering U.S. Pat. No. 5,644,551 entitled "Adaptable Engine Usage Meter" relates to a meter connected to the ignition wire of a mower engine, and mounted on a mower handlebar.

U.S. Pat. No. 6,609,357 entitled "Lawn and Garden Control Module" relates to a controller for monitoring inputs relating to status of a mower/tractor for determining a safety status condition and inhibiting operation in response to a determination of a safety status condition.

U.S. Pat. No. 6,972,668 entitled "Tamper-Evident Use-indicating Odometer and Engine-Timer" relates to a tamper evident combined odometer and engine time recorder.

Some mowing vehicle warranties may be hour-limited. However, if the hourmeter is unplugged, the engine can run without accumulating time on the hourmeter. This would allow a user to unplug the hourmeter and continue operating the lawn mower without falling out of the warranty period.

A tamper resistant hourmeter is needed for a grass mowing machine to ensure time is recorded and accumulated while the engine is running. A tamper resistant hourmeter is needed that will prevent a user from unplugging it for unrecorded use of the mower.

SUMMARY OF THE INVENTION

A tamper resistant hourmeter is provided for a grass mowing machine, having a voltage input from a battery through a key switch, and a magneto input from a magneto ignition that triggers the tamper resistant hourmeter to record engine operation time if both inputs are received. A voltage output from the tamper resistant hourmeter is provided to a fuel shutoff solenoid. If the tamper resistant hourmeter is removed, the solenoid does not receive the voltage needed to keep the fuel line open. As a result, the engine does not receive fuel necessary to run.

DESCRIPTION OF THE PREFERRED EMBODIMENT

Figure 1:
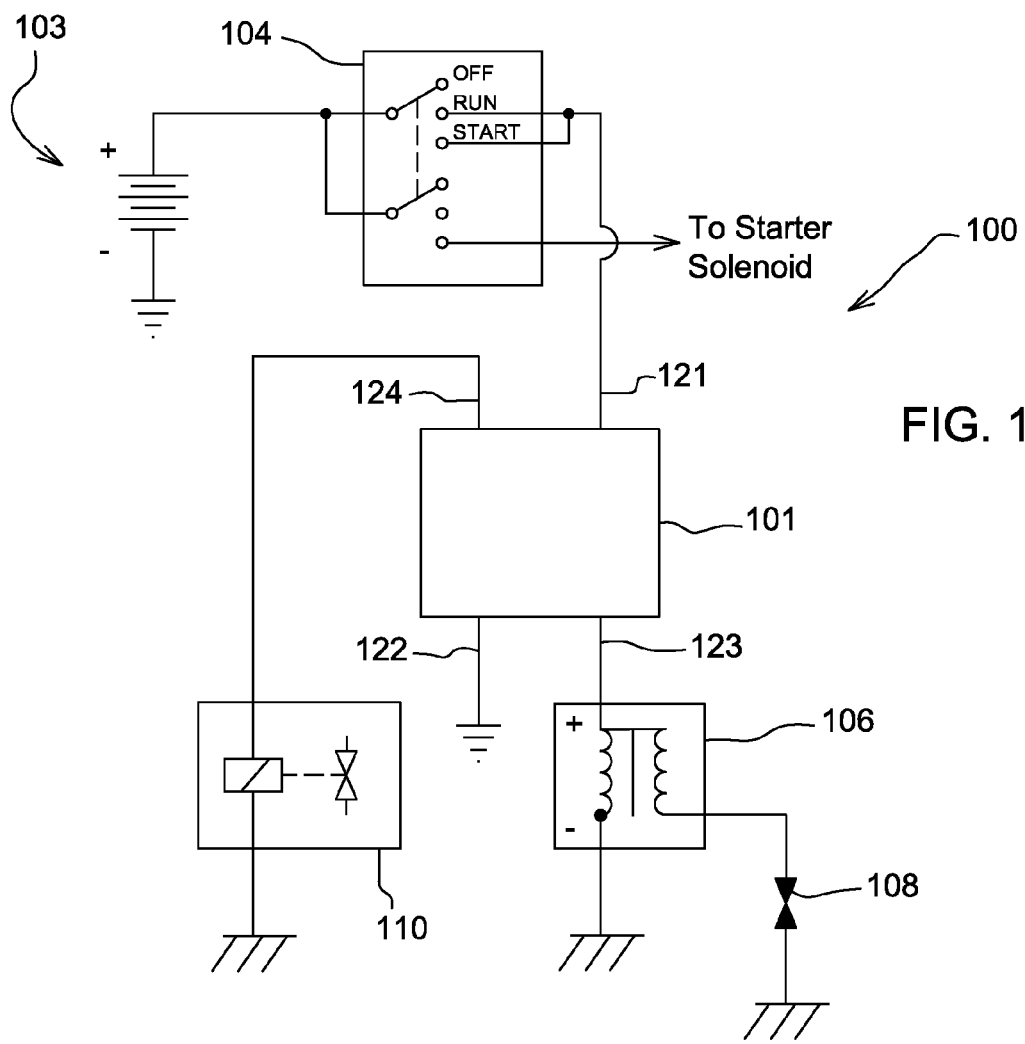
FIG. 1 is a schematic diagram of a circuit for a lawn mower including a tamper resistant hourmeter according to a first embodiment of the invention.

FIG. 1 is a schematic diagram showing circuit 100 including tamper resistant hourmeter 101 in one embodiment of the invention. Circuit 100 also includes battery 103, key switch 104, magneto ignition 106, and fuel shutoff solenoid 110.

The tamper resistant hourmeter has four connecting pins 121-24 to the circuit. First connecting pin 121 is connected through key switch 104 to the positive voltage terminal of battery 103, which provides a voltage between about 9 VDC and about 16 VDC. The key switch may have an off position, and one or more operating positions including but not limited to a run position, and a start position. In the run or start positions, key switch 104 connects the positive voltage terminal of battery 103 to input connecting pin 121 of the tamper resistant hourmeter.

Second connecting pin 122 is to ground. Third connecting pin 123 is connected to magneto ignition 106 which provides voltage to spark plug(s) 108. Voltage from magneto ignition to pin 123 is required to trigger the hourmeter to count and record time. If battery provides a +12 volt input to pin 121, and the magneto ignition provides voltage to pin 123, the tamper resistant hourmeter records engine operation time and provides the cumulative time count on display 125 shown in FIG. 2. Optionally, the tamper resistant hourmeter also may include a service light that remains actuated while engine operation time is recorded.

In the embodiment of FIG. 1, fourth connecting pin 124 provides a +12 volt output from the tamper resistant hourmeter to fuel shut off solenoid 110. The voltage is provided from the battery through the tamper resistant hourmeter to fuel shut-off solenoid 110 only while the key is in the run or start positions. In the powered position, the fuel shutoff solenoid allows fuel to be provided to the internal combustion engine. The fuel shutoff solenoid is normally energized if the key switch is in either of the start or run positions, to maintain a valve between the fuel supply and carburetor in the open position. If tamper resistant hourmeter 101 is disconnected from circuit 100, or the key is in the off position, fuel shutoff solenoid 110 is not powered, the valve is closed, and the engine will not receive fuel required to run.

Figure 2:
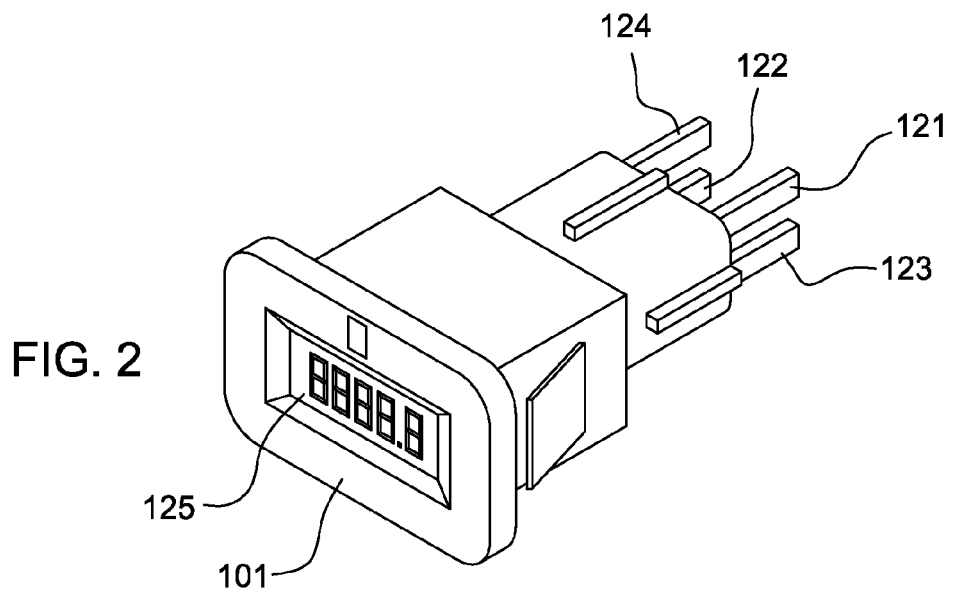
FIG. 2 is a perspective view of a tamper resistant hourmeter of the first embodiment.

As shown in FIG. 2, tamper resistant hourmeter 101 has four connecting pins: 12 volt DC input pin 121, ground pin 122, magneto trigger pin 123 and 12 volt DC output pin 124, and may be mounted to the dash or front panel in the operator station of a mower. Digital display 125 indicates engine operation time to tenths of hours. The tamper resistant hourmeter also may provide one or more service reminders at pre-specified engine operating times.

Having described a preferred embodiment, it will become apparent that various modifications can be made without departing from the scope of the invention as defined in the accompanying claims.

The invention claimed is:

1. A tamper resistant hourmeter for an engine powered lawn mower, comprising:
    a voltage input from a battery through a key switch, and a magneto input from a magneto ignition that triggers the tamper resistant hourmeter to record engine operation time if both inputs are received; and
    a voltage output to a fuel shutoff solenoid.

2. The tamper resistant hourmeter of claim 1 further comprising a digital display of engine operation time.

3. The tamper resistant hourmeter of claim 1 further comprising a service light that remains actuated while engine operation time is recorded.

4. A tamper resistant hourmeter for an engine powered lawn mower, comprising:
    a first pin connected to a positive voltage from a battery through a key actuated switch;
    a second pin to ground;
    a third pin to a magneto ignition; and
    a fourth pin to a fuel shutoff solenoid; the tamper resistant hourmeter connecting the positive voltage from the battery to the fuel shutoff solenoid.

5. The tamper resistant hourmeter of claim 4 wherein the key actuated switch includes an off position, a run position, and a start position.

6. The tamper resistant hourmeter of claim 5 wherein the fuel shutoff solenoid opens a fuel line to the engine only if the key actuated switch is in the run position or start position.

* * * * *